US010462283B2

(12) United States Patent
Frenz et al.

(10) Patent No.: US 10,462,283 B2
(45) Date of Patent: Oct. 29, 2019

(54) GEO-FENCING IN A BUILDING AUTOMATION SYSTEM

(71) Applicant: Ademco Inc., Golden Valley, MN (US)

(72) Inventors: Jonathan Frenz, Minneapolis, MN (US); Joel Swanson, Golden Valley, MN (US)

(73) Assignee: ADEMCO INC., Golden Valley, MN (US)

( * ) Notice: Subject to any disclaimer, the term of this patent is extended or adjusted under 35 U.S.C. 154(b) by 0 days.

(21) Appl. No.: 15/933,134

(22) Filed: Mar. 22, 2018

(65) Prior Publication Data
US 2018/0219994 A1 Aug. 2, 2018

Related U.S. Application Data

(63) Continuation of application No. 14/668,800, filed on Mar. 25, 2015, now Pat. No. 9,967,391.

(51) Int. Cl.
*H04M 1/725* (2006.01)
*H04W 4/021* (2018.01)
(Continued)

(52) U.S. Cl.
CPC ....... *H04M 1/72572* (2013.01); *H04W 4/021* (2013.01); *H04W 4/043* (2013.01);
(Continued)

(58) Field of Classification Search
CPC ..... H04W 4/021; H04W 16/14; H04W 4/028; H04W 64/00; H04W 72/04;
(Continued)

(56) References Cited

U.S. PATENT DOCUMENTS 6,255,988 B1 7/2001 Bischoff
6,356,282 B2 3/2002 Roytman et al.
(Continued)

FOREIGN PATENT DOCUMENTS

CN 103175287 A 6/2013
CN 104704863 A 6/2015
(Continued)

OTHER PUBLICATIONS

U.S. Appl. No. 14/696,662, filed Apr. 27, 2015.
(Continued)

*Primary Examiner* — Kwasi Karikari
(74) *Attorney, Agent, or Firm* — Husch Blackwell LLP

(57) ABSTRACT

A mobile device having location services may store information pertaining to a geo-fence that is associated with a user of the mobile device and assigned to a location. The mobile device may identify a current location of the mobile device and store data pertaining to the location of the mobile device. The mobile device determines a current geo-fence state of the mobile device based on the location data in response to an internal stimuli or an external stimuli. The geo-fence state is selected from at least an inside geo-fence state in which the mobile device is deemed to be inside the geo-fence and an outside geo-fence state in which the mobile device is deemed to be outside of the geo-fence. The mobile device may notify a remote server of the current geo-fence state.

18 Claims, 7 Drawing Sheets

(51) Int. Cl.
*H04W 4/04* (2009.01)
*H04W 40/24* (2009.01)
*H04W 48/04* (2009.01)
*H04W 4/33* (2018.01)
*H04W 4/30* (2018.01)

(52) U.S. Cl.
CPC .............. *H04W 4/30* (2018.02); *H04W 4/33* (2018.02); *H04W 40/248* (2013.01); *H04W 48/04* (2013.01)

(58) Field of Classification Search
CPC ......... H04W 36/0016; H04W 36/0072; H04W 36/32; H04W 4/025; H04W 64/006; H04W 48/20; H04W 4/027; H04W 4/08; H04W 88/12; H04W 8/12; H04W 92/02
See application file for complete search history.

(56) References Cited

U.S. PATENT DOCUMENTS

| | | |
|---|---|---|
| 6,400,956 B1 | 6/2002 | Richton |
| 6,478,233 B1 | 11/2002 | Shah |
| 6,529,137 B1 | 3/2003 | Roe |
| 6,604,023 B1 | 8/2003 | Brown et al. |
| 6,665,613 B2 | 12/2003 | Duvall |
| 6,909,891 B2 | 6/2005 | Yamashita et al. |
| 6,990,335 B1 | 1/2006 | Shamoon et al. |
| 7,083,109 B2 | 8/2006 | Pouchak |
| 7,127,734 B1 | 10/2006 | Amit |
| 7,130,719 B2 | 10/2006 | Ehlers et al. |
| 7,155,305 B2 | 12/2006 | Hayes et al. |
| D535,573 S | 1/2007 | Barton et al. |
| 7,159,789 B2 | 1/2007 | Schwendinger et al. |
| 7,257,397 B2 | 8/2007 | Shamoon et al. |
| 7,327,250 B2 | 2/2008 | Harvey |
| 7,385,500 B2 | 6/2008 | Irwin |
| D580,801 S | 11/2008 | Takach et al. |
| 7,451,017 B2 | 11/2008 | McNally |
| 7,510,126 B2 | 3/2009 | Rossi et al. |
| 7,571,865 B2 | 8/2009 | Nicodem et al. |
| 7,614,567 B2 | 11/2009 | Chapman, Jr. et al. |
| 7,636,604 B2 | 12/2009 | Bergman et al. |
| 7,668,532 B2 | 2/2010 | Shamoon et al. |
| 7,768,393 B2 | 8/2010 | Nigam |
| 7,801,646 B2 | 9/2010 | Amundson et al. |
| 7,812,274 B2 | 10/2010 | Dupont et al. |
| 7,839,275 B2 | 11/2010 | Spalink et al. |
| 7,908,211 B1 | 3/2011 | Chen et al. |
| 7,949,615 B2 | 5/2011 | Ehlers et al. |
| 7,953,518 B2 | 5/2011 | Kansal et al. |
| 7,973,678 B2 | 7/2011 | Petricoin, Jr. et al. |
| 8,018,329 B2 | 9/2011 | Morgan et al. |
| 8,064,935 B2 | 11/2011 | Shamoon et al. |
| 8,065,342 B1 | 11/2011 | Borg et al. |
| 8,095,340 B2 | 1/2012 | Brown |
| 8,125,332 B2 | 2/2012 | Curran et al. |
| 8,180,492 B2 | 5/2012 | Steinberg |
| 8,195,313 B1 | 6/2012 | Fadell et al. |
| 8,205,244 B2 | 6/2012 | Nightingale et al. |
| 8,232,877 B2 | 7/2012 | Husain |
| 8,255,090 B2 | 8/2012 | Frader-Thompson et al. |
| 8,269,620 B2 | 9/2012 | Bullemer et al. |
| 8,280,536 B1 | 10/2012 | Fadell et al. |
| 8,301,765 B2 | 10/2012 | Goodman |
| 8,332,055 B2 | 12/2012 | Veillette |
| 8,350,697 B2 | 1/2013 | Trundle et al. |
| 8,386,082 B2 | 2/2013 | Oswald |
| 8,390,473 B2 | 3/2013 | Krzyzanowski et al. |
| 8,412,381 B2 | 4/2013 | Nikovski et al. |
| 8,412,654 B2 | 4/2013 | Montalvo |
| 8,428,867 B2 | 4/2013 | Ashley, Jr. et al. |
| 8,433,344 B1 | 4/2013 | Virga |
| 8,442,695 B2 | 5/2013 | Imes et al. |
| 8,457,797 B2 | 6/2013 | Imes et al. |
| 8,509,954 B2 | 8/2013 | Imes et al. |
| 8,531,294 B2 | 9/2013 | Slavin et al. |
| 8,554,374 B2 | 10/2013 | Lunacek et al. |
| 8,554,714 B2 | 10/2013 | Raymond et al. |
| 8,560,127 B2 | 10/2013 | Leen et al. |
| 8,571,518 B2 | 10/2013 | Imes et al. |
| 8,587,445 B2 | 11/2013 | Rockwell |
| 8,620,841 B1 | 12/2013 | Filson et al. |
| 8,626,344 B2 | 1/2014 | Imes et al. |
| 8,630,741 B1 | 1/2014 | Matsuoka et al. |
| 8,648,706 B2 | 2/2014 | Ranjun et al. |
| 8,670,783 B2 | 3/2014 | Klein |
| 8,686,841 B2 | 4/2014 | Macheca et al. |
| 8,718,826 B2 | 5/2014 | Ramachandran et al. |
| 8,798,804 B2 | 8/2014 | Besore et al. |
| 8,810,454 B2 | 8/2014 | Cosman |
| 8,812,024 B2 | 8/2014 | Obermeyer et al. |
| 8,812,027 B2 | 8/2014 | Obermeyer et al. |
| 8,840,033 B2 | 9/2014 | Steinberg |
| 8,874,129 B2 | 10/2014 | Forutanpour et al. |
| 8,886,178 B2 | 11/2014 | Chatterjee |
| 8,890,675 B2 | 11/2014 | Ranjan et al. |
| 8,909,256 B2 | 12/2014 | Fraccaroli |
| 8,918,219 B2 | 12/2014 | Sloo et al. |
| 8,941,489 B2 | 1/2015 | Sheshadri et al. |
| 8,965,401 B2 | 2/2015 | Sheshadri et al. |
| 8,965,406 B2 | 2/2015 | Henderson |
| 9,026,261 B2 | 5/2015 | Bukhin et al. |
| 9,033,255 B2 | 5/2015 | Tessier et al. |
| 9,055,475 B2 | 6/2015 | Lacatus et al. |
| 9,071,453 B2 | 6/2015 | Shoemaker et al. |
| 9,113,298 B2 | 8/2015 | Qiu |
| 9,167,381 B2 | 10/2015 | McDonald et al. |
| 9,168,927 B2 | 10/2015 | Louboutin |
| 9,183,530 B2 | 11/2015 | Schwarz et al. |
| 9,210,545 B2 | 12/2015 | Sabatelli et al. |
| 9,215,560 B1 | 12/2015 | Jernigan |
| 9,219,983 B2 | 12/2015 | Sheshadri et al. |
| 9,247,378 B2 | 1/2016 | Bisson et al. |
| 9,280,559 B1 | 3/2016 | Jones |
| 9,288,620 B2 | 3/2016 | Menendez |
| 9,307,344 B2 | 4/2016 | Rucker et al. |
| 9,311,685 B2 | 4/2016 | Harkey et al. |
| 9,313,320 B2 | 4/2016 | Zeilingold et al. |
| 9,363,638 B1 | 6/2016 | Jones |
| 9,363,772 B2 | 6/2016 | Burks |
| 9,396,344 B1 | 7/2016 | Jones |
| 9,414,422 B2 | 8/2016 | Belghoul et al. |
| 9,433,681 B2 | 9/2016 | Constien et al. |
| 9,449,491 B2 | 9/2016 | Sager et al. |
| 9,491,577 B1 | 11/2016 | Jones |
| 9,589,435 B2 | 3/2017 | Finlow-Bates |
| 9,635,500 B1 | 4/2017 | Becker et al. |
| 9,645,589 B2 | 5/2017 | Leen et al. |
| 2002/0147006 A1 | 10/2002 | Coon et al. |
| 2005/0172056 A1 | 8/2005 | Ahn |
| 2006/0063522 A1 | 3/2006 | McFarland |
| 2006/0097063 A1 | 5/2006 | Zeevi |
| 2007/0037605 A1 | 2/2007 | Logan |
| 2007/0099626 A1 | 5/2007 | Lawrence et al. |
| 2007/0114295 A1 | 5/2007 | Jenkins |
| 2007/0249319 A1 | 10/2007 | Faulkner et al. |
| 2008/0094230 A1 | 4/2008 | Mock et al. |
| 2009/0075677 A1* | 3/2009 | Seger ................. G08B 21/0261 455/456.6 |
| 2009/0309709 A1 | 12/2009 | Bevacqua et al. |
| 2010/0034386 A1 | 2/2010 | Choong et al. |
| 2010/0042940 A1 | 2/2010 | Monday et al. |
| 2010/0081375 A1 | 4/2010 | Rosenblatt et al. |
| 2010/0127854 A1 | 5/2010 | Helvick et al. |
| 2010/0156628 A1 | 6/2010 | Ainsbury et al. |
| 2010/0203901 A1* | 8/2010 | Dinoff .................. H04W 4/022 455/456.3 |
| 2010/0261465 A1 | 10/2010 | Rhoads et al. |
| 2011/0153525 A1 | 6/2011 | Benco et al. |
| 2012/0172027 A1 | 7/2012 | Partheesh et al. |
| 2012/0191257 A1 | 7/2012 | Corcoran et al. |
| 2012/0209730 A1 | 8/2012 | Garrett |
| 2012/0259466 A1 | 10/2012 | Ray et al. |

(56) References Cited

U.S. PATENT DOCUMENTS

| | | |
|---|---|---|
| 2012/0284769 A1 | 11/2012 | Dixon et al. |
| 2013/0073094 A1 | 3/2013 | Knapton et al. |
| 2013/0204441 A1 | 8/2013 | Sloo et al. |
| 2013/0225196 A1 | 8/2013 | James et al. |
| 2013/0231137 A1 | 9/2013 | Hugie et al. |
| 2013/0310053 A1 | 11/2013 | Srivastava et al. |
| 2013/0318217 A1 | 11/2013 | Imes et al. |
| 2013/0331087 A1 | 12/2013 | Shoemaker et al. |
| 2014/0031989 A1 | 1/2014 | Bergman et al. |
| 2014/0031991 A1 | 1/2014 | Bergman et al. |
| 2014/0100835 A1 | 4/2014 | Majumdar et al. |
| 2014/0156087 A1 | 6/2014 | Amundson |
| 2014/0162692 A1 | 6/2014 | Li et al. |
| 2014/0164118 A1 | 6/2014 | Polachi |
| 2014/0172176 A1 | 6/2014 | Deilmann et al. |
| 2014/0200718 A1 | 7/2014 | Tessier |
| 2014/0244048 A1 | 8/2014 | Ramachandran et al. |
| 2014/0266635 A1 | 9/2014 | Roth et al. |
| 2014/0277762 A1 | 9/2014 | Drew |
| 2014/0302879 A1 | 10/2014 | Kim et al. |
| 2014/0330435 A1 | 11/2014 | Stoner et al. |
| 2014/0337123 A1 | 11/2014 | Nuernberg et al. |
| 2014/0349672 A1 | 11/2014 | Kem, Jr. et al. |
| 2014/0370911 A1 | 12/2014 | Gorgenyi et al. |
| 2015/0065161 A1 | 3/2015 | Ganesh et al. |
| 2015/0094860 A1 | 4/2015 | Finnerty et al. |
| 2015/0140994 A1 | 5/2015 | Partheesh et al. |
| 2015/0141045 A1 | 5/2015 | Qiu et al. |
| 2015/0159895 A1 | 6/2015 | Quam et al. |
| 2015/0163631 A1 | 6/2015 | Quam et al. |
| 2015/0163945 A1 | 6/2015 | Barton et al. |
| 2015/0186497 A1 | 7/2015 | Patton et al. |
| 2015/0237470 A1 | 8/2015 | Mayor et al. |
| 2015/0271638 A1 | 9/2015 | Menayas et al. |
| 2015/0301543 A1 | 10/2015 | Janoso et al. |
| 2015/0338116 A1 | 11/2015 | Furuta et al. |
| 2015/0370272 A1 | 12/2015 | Reddy et al. |
| 2015/0372832 A1 | 12/2015 | Kortz et al. |
| 2016/0007156 A1 | 1/2016 | Chiou et al. |
| 2016/0054865 A1 | 2/2016 | Kerr et al. |
| 2016/0057572 A1 | 2/2016 | Bojorquez Alfaro et al. |
| 2016/0142872 A1 | 5/2016 | Nicholson et al. |
| 2016/0223998 A1 | 8/2016 | Songkakul et al. |
| 2017/0026506 A1 | 1/2017 | Haepp et al. |

FOREIGN PATENT DOCUMENTS

| | | |
|---|---|---|
| CN | 105318499 A | 2/2016 |
| DE | 102013226390 A1 | 6/2015 |
| EP | 1515289 A1 | 3/2005 |
| EP | 2607802 A2 | 6/2013 |
| EP | 2675195 A2 | 12/2013 |
| EP | 3001116 A1 | 3/2016 |
| JP | 2011203841 A | 10/2011 |
| JP | 2012109680 A | 6/2012 |
| MX | 2012000906 A | 9/2012 |
| WO | 2006055334 A1 | 5/2006 |
| WO | 2009034720 A1 | 3/2009 |
| WO | 2009036764 A2 | 3/2009 |
| WO | 2009067251 A1 | 5/2009 |
| WO | 2011011404 A1 | 1/2011 |
| WO | 2011121299 A1 | 10/2011 |
| WO | 2012000107 A1 | 1/2012 |
| WO | 2012068517 A1 | 5/2012 |
| WO | 2013170791 A1 | 11/2013 |
| WO | 2014016705 A2 | 1/2014 |
| WO | 2014047501 A1 | 3/2014 |
| WO | 2014055939 A1 | 4/2014 |
| WO | 2014144323 A1 | 9/2014 |
| WO | 2014197320 A1 | 12/2014 |
| WO | 2014200524 A2 | 12/2014 |
| WO | 2015047739 A1 | 4/2015 |
| WO | 2015089116 A1 | 6/2015 |
| WO | 2015164400 A1 | 10/2015 |

OTHER PUBLICATIONS

U.S. Appl. No. 14/696,725, filed Apr. 27, 2015.
U.S. Appl. No. 14/933,948, filed Nov. 5, 2015.
U.S. Appl. No. 14/934,543, filed Nov. 6, 2015.
U.S. Appl. No. 14/938,595, filed Nov. 11, 2015.
U.S. Appl. No. 14/938,642, filed Nov. 11, 2015.
U.S. Appl. No. 14/964,264, filed Dec. 9, 2015.
U.S. Appl. No. 14/964,349, filed Dec. 9, 2015.
Balaji et al., "Sentinel: Occupancy Based HVAC Actuation Using Existing WiFi Infrastructure Within Commercial Buildings," SenSys T3, 14 pages, Nov. 11-15, 2015.
"Petition for Inter Partes Review of U.S. Pat. No. 8,571,518 Pursuant to 35 U.S.C. 311-319, 37 CFR 42," Inventor Imes et al., dated Oct. 29, 2014.
Do, "Programmable Communicating Thermostats for Demand Response in California," DR ETD Workshop, 26 pages, Jun. 11, 2007.
Green, "PM's Thermostat Guide," Popular Mechanics, pp. 155-158, Oct. 1985.
Gupta et al., "Adding GPS-Control to Traditional Thermostats: An Exploration of Potential Energy Savings and Design Challenges," Pervasive, LNCS 5538, pp. 95-114, 2009.
Gupta, "A Persuasive GPS-Controlled Thermostat System," 89 pages, Sep. 2008.
http://community.lockitron.com/notifications-geofencing-scheduling-sense-bluetooth/633, "Lockitron Community, Notifications, Geofencing Scheduling, Sense/Bluetooth," 14 pages, printed Oct. 29, 2014.
http://stackoverflow.com/questions/14232712/tracking-multiple20-locations-with-ios-geofencing, "Tracking Multiple (20+) Locations with iOS Geofencing—Stack Overflow," 2 pages, printed Oct. 29, 2014.
http://www.allure-energy.com/aenfjan9_12.html, "CES Gets First Look at EverSense," Allure Energy, 2 pages, printed Feb. 17, 2015.
http://IWww.prnev.tswire.com/nev.ts-releases/allure-energy-unveils-a-combination-of-ibeacon-and-nfc-enabled-smart-sensortechnology-known-as-aura-23885 . . . , "Allure Energy Unveils a Combination of iBeacon and NFC Enabled Smart Sensor Technology Known as Aura," 6 pages, Jan. 6, 2014.
Mobile Integrated Solutions, LLC, "MobiLinc Take Control of Your Home, MobiLinc and Geo-Fence Awareness," 9 pages, downloaded Mar. 27, 2015.
Pan et al., "A Framework for Smart Location-Based Automated Energy Controls in a Green Building Testbed," 6 pages, downloaded Jan. 30, 2015.
SmartThings Inc., "2 Ecobee Si Thermostat + Geofencing," 17 pages, downloaded Nov. 3, 2014.
U.S. Appl. No. 15/048,902, filed Feb. 19, 2016.
The Extended European Search Report and Opinion for EP Application No. 16156760.7-1862, dated Jul. 8, 2016.
The Extended European Search Report for EP Application No. 1619416, dated Feb. 2, 2017.
The Extended European Search Report for EP Application No. 16196128.9, dated Mar. 7, 2017.
Gentec, "Feature Focus, Threat Level Management," 2 pages, 2013.
Scanlon et al., "Mutual Information Based Visual Feature Selection for Lipreading," 8th International Conference on Spoken Language Processing, 5 pages, Oct. 4-8, 2004.
Transportation Research Board of the National Academies, "Commuting in America III, the Third National Report on Commuting Patterns and Trends" 199 pages, 2006.
Allure Energy, "Our Technology," http://www.allure-energy.com/pages/about.jsp 1 page, printed May 30, 2012.
The Extended European Search Report for EP Application No. 16195639.6, dated May 31, 2017.
The International Search Report for PCT Application No. PCT/US2010/042589 dated Nov. 22, 2010.
Mozer, "The Neural Network House: An Environment that Adapts to Its Inhabitants," Department of Computer Science, University of Colorado, 5 pages, downloaded May 29, 2012.

* cited by examiner

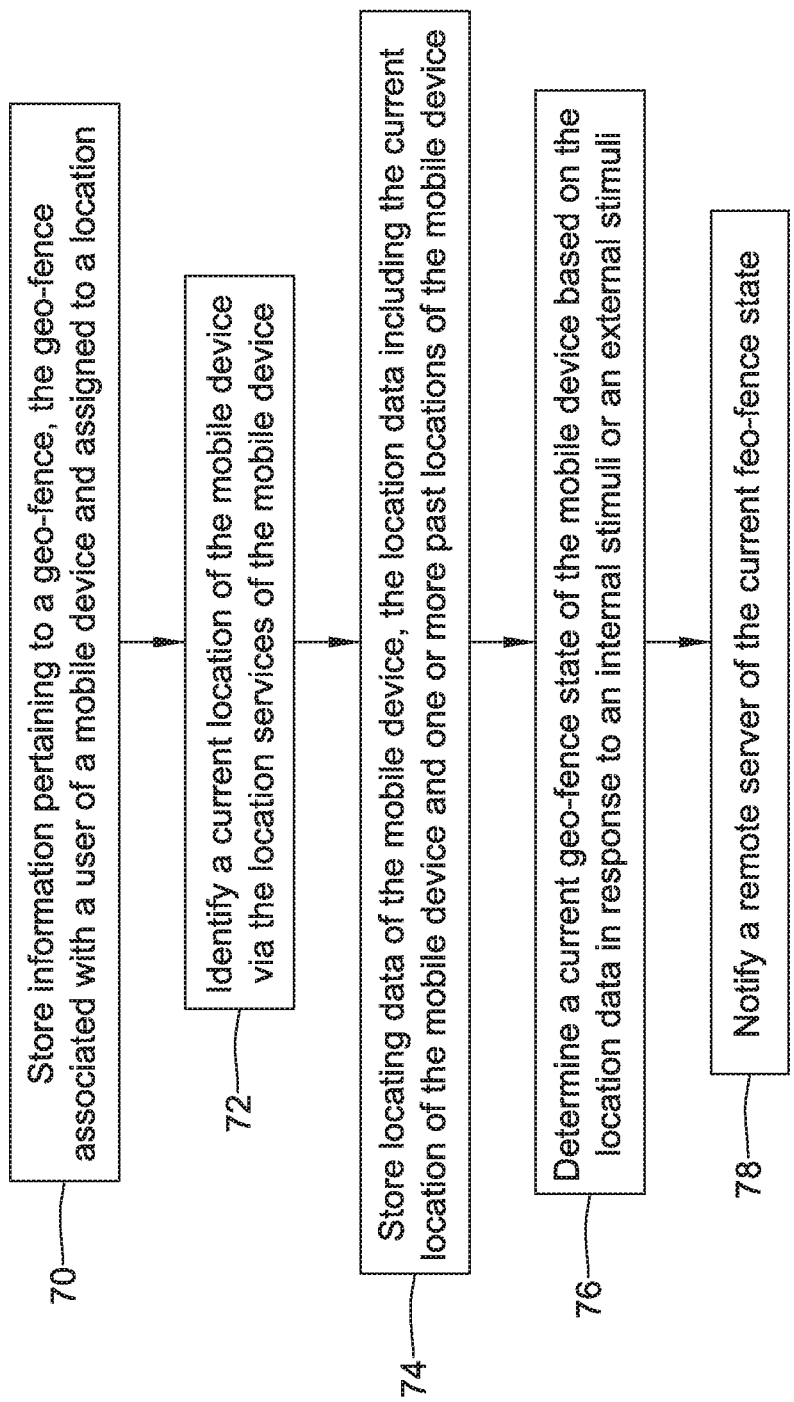

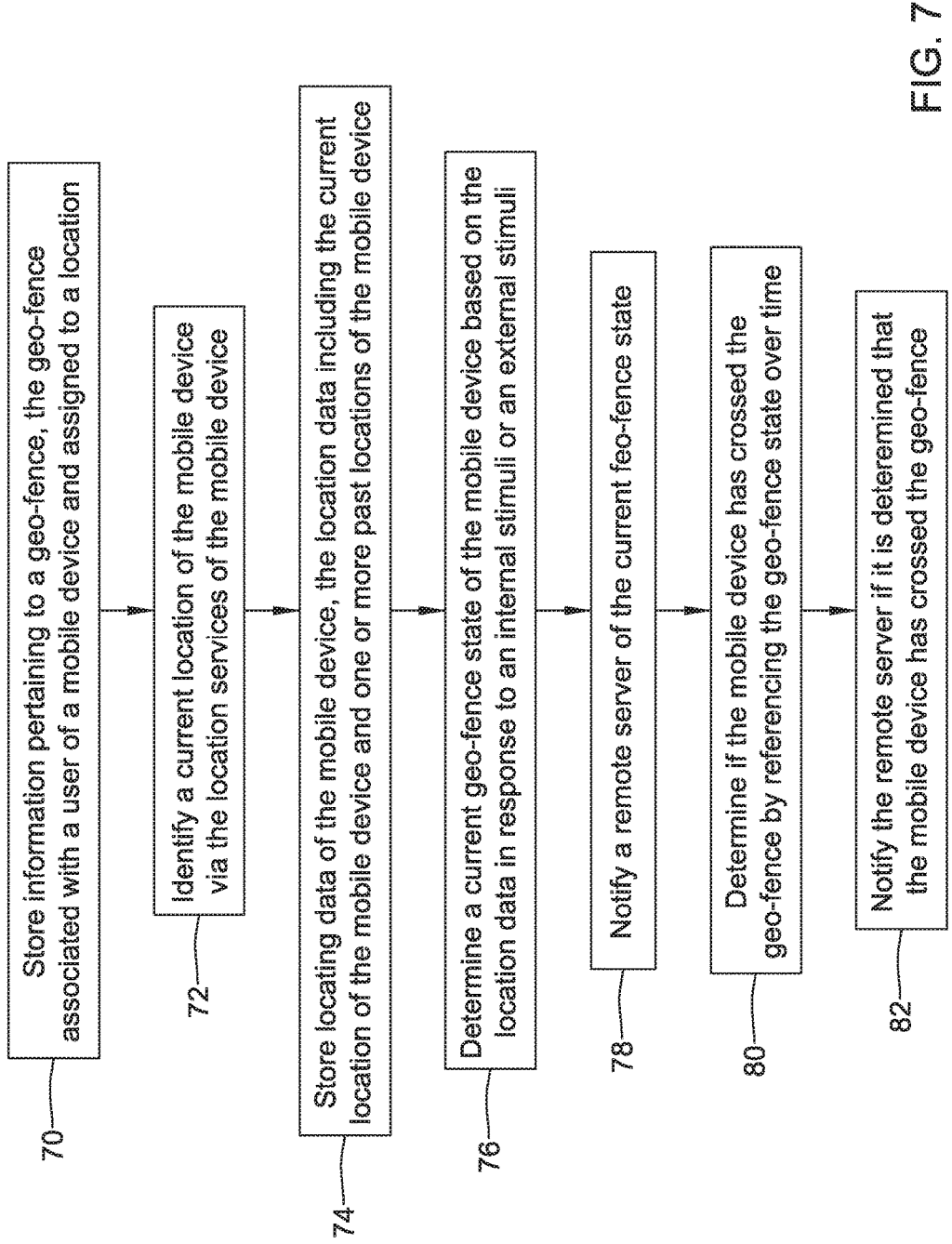

GEO-FENCING IN A BUILDING AUTOMATION SYSTEM

This application is a continuation of co-pending U.S. patent application Ser. No. 14/668,800, filed Mar. 25, 2015, entitled, "GEO-FENCING IN A BUILDING AUTOMATION SYSTEM," which is incorporated herein by reference.

TECHNICAL FIELD

The disclosure relates generally to building automation, and more particularly to building automation systems with geo-fencing capabilities.

BACKGROUND

Building automation systems are often used to control safety, security and/or comfort levels within a building or other structure. Illustrative but non-limiting examples of building automation systems include Heating, Ventilation and/or Air Conditioning (HVAC) systems, security systems, lighting systems, fire suppression systems and/or the like. In some cases, a building automation system may enter an unoccupied mode when the building is expected to be unoccupied and an occupied mode when the building is expected to be occupied. For example, when the building automation system includes an HVAC system, the building automation system may set a temperature set point of the HVAC system to a more energy efficient setting when in an unoccupied mode and a more comfortable setting when in an occupied mode. In another example, when the building automation system includes a security system, the building automation system may set the security system to a locked or away state when in an unoccupied mode and an unlocked or home state when in an occupied mode.

SUMMARY

The present disclosure pertains generally to geo-fencing, and more particularly to improvements in the accuracy and robustness of geo-fencing. An example of the disclosure may be found in a non-transitory computer-readable storage medium with an executable program stored thereon. The executable program may instruct a mobile device having location services to store information pertaining to a geo-fence associated with the user of the mobile device and assigned to a particular building or location. The executable program may instruct the mobile device to identify a current location of the mobile device via location services, and store location data that includes the current location of the mobile device and one or more past locations of the mobile device. The executable program may instruct the mobile device to determine a current geo-fence state (e.g. inside the geo-fence or outside the geo-fence) of the mobile device based on the location data, sometimes in response to an internal stimuli or an external stimuli. The executable program may instruct the mobile device to notify a remote server of the current geo-fence state, sometimes automatically and/or on-demand.

Another example of the disclosure may be found in a building automation server for servicing a user's building. The building automation server may include an input for receiving a geo-fence state of one or more mobile devices, and an output for outputting a command to a building controller in the user's building. The building automation server may include a controller operably coupled to the input and the output. The controller may be configured to maintain a current geo-fence state for each of the one or more mobile devices based on the geo-fence state received from each of the one or more mobile devices. The controller may be further configured to output a command via the output to change a set point of the building controller to an energy saving set point upon detection that all of the one or more mobile devices associated with a building are in an outside geo-fence state, and to output a command via the output to change the set point of the building controller to a comfort set point upon detecting of all of the one or more mobile devices associated with the building are not in the outside geo-fence state. The controller may be further configured to not send a new command to change the set point of the building controller if the received geo-fence state of the one or more mobile devices associated with the building would not result in the controller outputting a different command than the previous command that was output by the controller by the controller.

Another example of the disclosure may be found in a mobile device having location services. The mobile device may include a user interface, a memory and a controller. The controller may be configured to check the location of the mobile device via the location services of the mobile device and to compare a current detected location relative to a stored geo-fence with a previously detected location relative to the stored geo-fence.

In some cases, the controller may check the location of the mobile device relative to the geo-fence from time to time, or in response to an internal stimuli. The internal stimuli may include, for example: detecting a restoration of a cellular service to the mobile device; detecting a restoration of an internet service to the mobile device; detecting a restoration of the location services of the mobile device; detecting a user logging into an executable program on the mobile device; detecting a wake up condition from a force close of an executable program on the mobile device; detecting the mobile device exiting an airplane mode; detecting a power on condition of the mobile device; detecting an updated geo-fence; detecting a new location and associated geo-fence; detecting that geo-fencing was turned on, and/or any other suitable internal stimuli.

In some cases, the controller may check the location of the mobile device relative to the geo-fence in response to an external stimuli. The external stimuli may include, for example: the mobile device being informed that a suspend mode of the geo-fence has been turned off at a remote location; the mobile device being informed that the geo-fence has been modified at a remote location; the mobile device being informed that another user has crossed the geo-fence; the mobile device being informed that the geo-fence state of another user has changed or that another user has turned geo-fencing on or off on their mobile device; the mobile device receiving a request for a current location from a remote location, and/or any other suitable external stimuli.

After checking the location of the mobile device, the controller may be configured to provide a remote server with the current detected location relative to the geo-fence if the current detected location relative to the geo-fence is different from the previously detected location relative to the geo-fence. The controller may be further configured to not provide the remote server with the current detected location relative to the geo-fence if the current detected location relative to the geo-fence is the same as the previously detected location relative to the geo-fence.

BRIEF DESCRIPTION OF THE DRAWINGS

FIG. 6 is a flow diagram showing an illustrative method that may be carried out by the mobile device of FIG. 5; and FIG. 7 is a flow diagram showing another illustrative method that may be carried out by the mobile device of FIG. 5.

Figure 1:
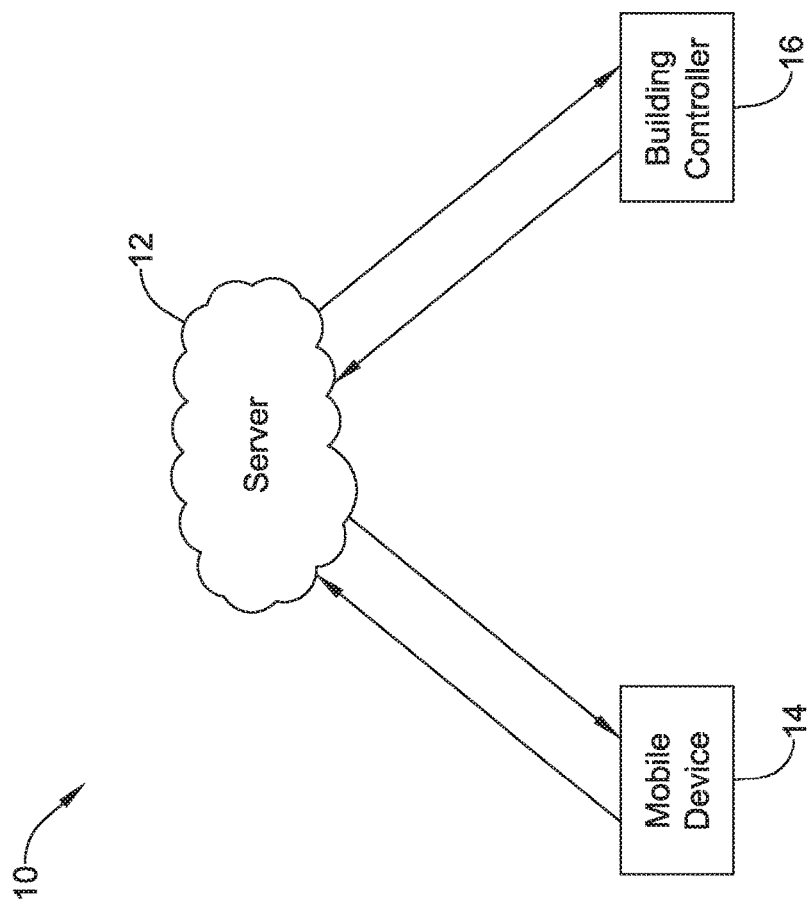
FIG. 1 is a schematic view of an illustrative building automation system.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements. The drawings, which are not necessarily to scale, are not intended to limit the scope of the disclosure. In some of the figures, elements not believed necessary to an understanding of relationships among illustrated components may have been omitted for clarity.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

The present disclosure is directed generally at building automation systems. Building automation systems are systems that control one or more operations of a building. Building automation systems can include HVAC systems, security systems, fire suppression systems, energy management systems and/or any other suitable systems. While HVAC systems are used as an example below, it should be recognized that the concepts disclosed herein can be applied to building control systems more generally.

A building automation system may include a controller, computer and/or other processing equipment that is configured to control one or more features, functions, systems or sub-systems of a building. In some cases, devices that can be used by individuals to communicate with the controller, computer and/or other processing equipment. In some cases, a building automation system may include a plurality of components that, in combination, perform or otherwise provide the functionality of the building automation system. A building automation system may be fully contained within a single building, or may include components that are spread between multiple housings and/or across multiple locations. In some embodiments, a building automation system, regardless of the physical location(s) of the components within the building automation system, may control one or more building systems within a single building. In some cases, a building automation system, regardless of the physical location(s) of the components within the building automation system, may control one or more building systems within a plurality of buildings, optionally in accordance with a common operating procedure and/or distinct operating procedures for each building as desired.

FIG. 1 is a schematic illustration of an illustrative building automation system 10. The illustrative building automation system 10 includes a server 12 that may be configured to communicate with a mobile device 14 and with a building controller 16. It will be appreciated that for simplicity, only a single mobile device 14 is shown, while in many cases the server 12 may be configured to communicate directly or indirectly with any number of mobile devices 14. Similarly, while a single building controller 16 is illustrated, in many cases the server 12 may be configured to communicate directly or indirectly with any number of building controllers 16, located in a single building or distributed throughout a plurality of buildings. The server 12 is illustrated as a single, cloud-based server. In some cases, the server 12 may be a single server. In some instances, the server 12 may generically represent two, three or more servers commonly located or spread between two or more physical locations. In some cases, the server 12 handles communication with both the mobile device 14 and the building controller 16. In some instances, as shown for example in FIG. 2, distinct servers may carry out each communications protocol if desired.

In some cases, the mobile devices 14 may communicate with the server 12 at least partially through a network such as the Internet, sometimes using a cell phone network, WiFi network and/or any other suitable network. Likewise, it is contemplated that the building controller 16 may communicate with the server 12 at least partially through a network such as the Internet, sometimes using a cell phone network, WiFi network and/or any other suitable network.

Figure 2:
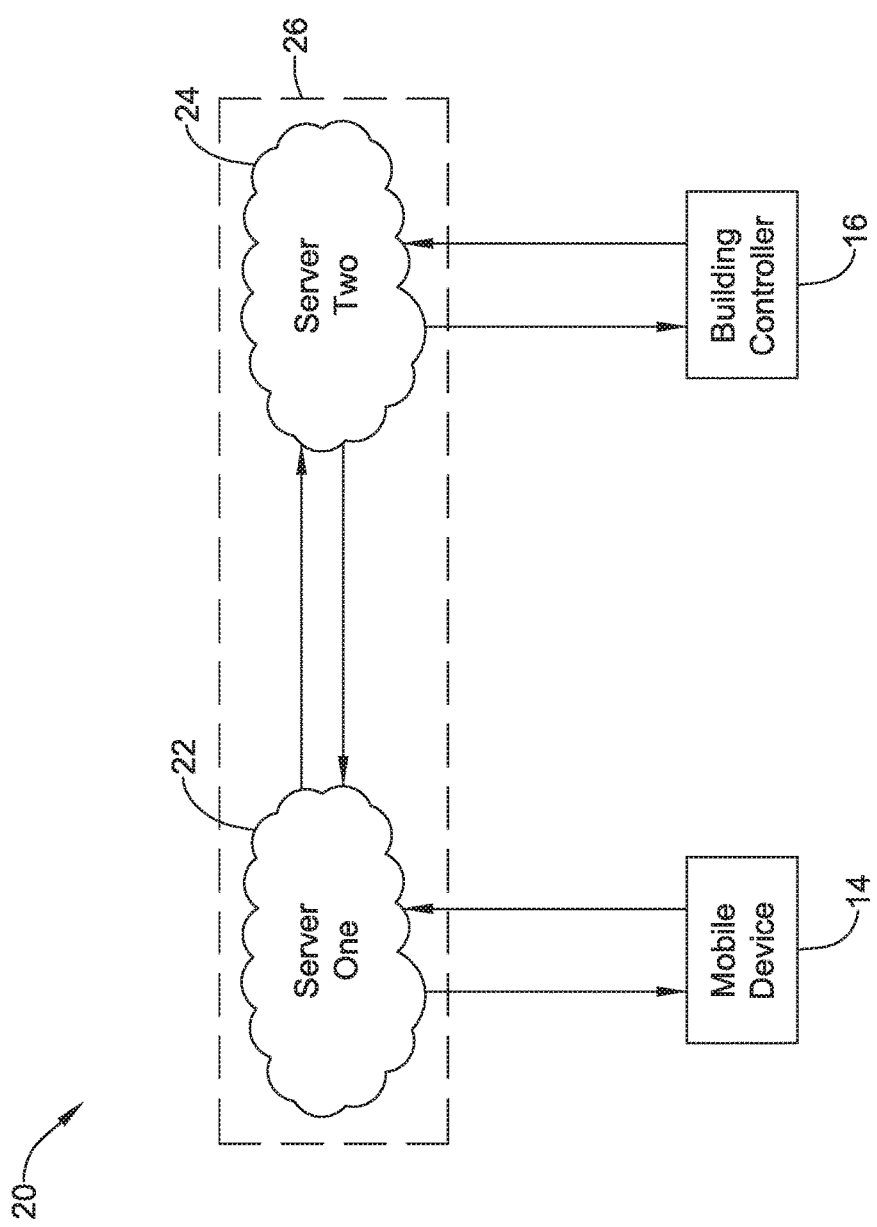
FIG. 2 is a schematic view of another illustrative building automation system.

FIG. 2 is a schematic illustration of another illustrative building automation system 20. The illustrative building automation system 20 includes a first server 22 that may be configured to communicate with a mobile device 14 (or multiple mobile devices 14) and a second server 24 that may be configured to communicate with a building controller 16 (or multiple building controllers 16). The first server 22 may be configured to receive data from the mobile device 14, process the data, and send data to the mobile device 14 and/or to the second server 24. The second server 24 may be configured to receive data from the building controller 16, process the data, and send data to the building controller 16 and/or to the first server 22. In some instances, the first server 22 may be configured to permit data from the mobile device 14 to pass directly through to the building controller 16. In some cases, the second server 24 may be configured to permit data from the building controller 16 to pass directly through to the mobile device 14. The first server 22 and the second server 24 may be configured to communicate with each other. In some cases, each of the first server 22 and the second server 24 may perform a defined function.

It will be appreciated that for simplicity, only a single mobile device 14 is shown, while in many cases the first server 22 may be configured to communicate directly or indirectly with any number of mobile devices 14. Similarly, while a single building controller 16 is illustrated, in many cases the second server 24 may be configured to communicate directly or indirectly with any number of building controllers 16, located in a single building or distributed throughout a plurality of buildings.

The first server 22 is illustrated as a single, cloud-based server. In some cases, the first server 22 may be a single server. In some instances, the first server 22 may generically represent two, three or more servers commonly located or spread between two or more physical locations. The second server 24 is illustrated as a single, cloud-based server. In some cases, the second server 24 may be a single server. In some instances, the second server 24 may generically represent two, three or more servers commonly located or spread between two or more physical locations. In some cases, the first server 22 and the second server 24 may, in combination, be considered as representing or forming a building automation server 26.

Figure 3:
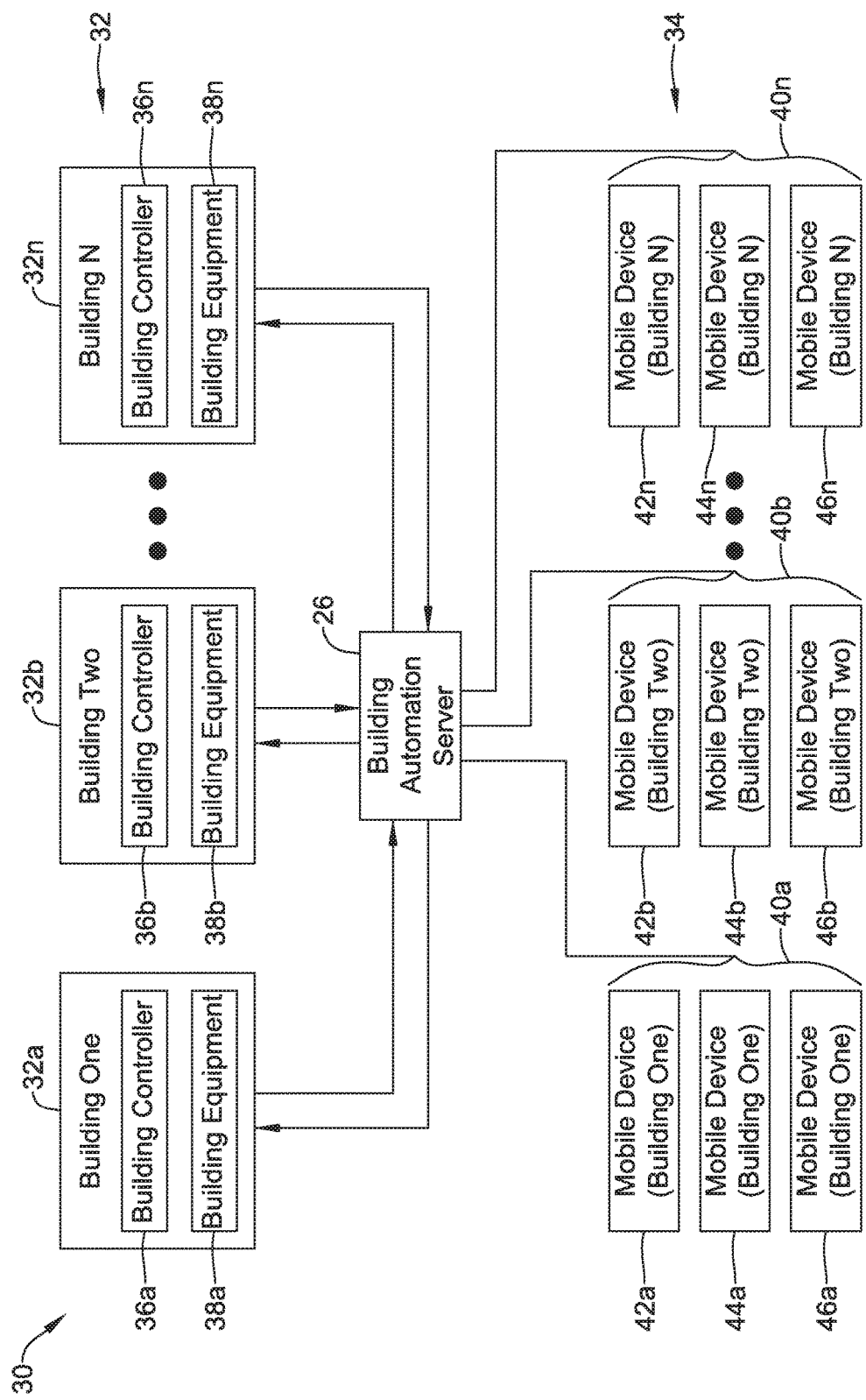
FIG. 3 is a schematic view of another illustrative building automation system.

FIG. 3 is a schematic illustration of a building automation system 30 in which a building automation server 26 is configured to communicate with a plurality of buildings 32 as well as a plurality of mobile devices 34. It is contemplated that the building automation server 26 may include a single server or two or more distinct servers at one or several locations. The building automation system 30 may serve any desired number of buildings. As illustrated, the plurality of buildings 32 includes a Building One, labeled as 32A, a Building Two, labeled as 32B, and so on through a Building "N", labeled as 32N. It will be appreciated that the building automation system 30 may include a large number of buildings, each in communication with a central (or distributed) building automation server 26. In some cases, each building may be associated with a unique customer account, as further described below.

As illustrated, each of the plurality of buildings 32 includes a building controller and one or more pieces of building equipment. The building equipment may, for example, be HVAC equipment, security equipment, lighting equipment, fire suppression equipment, and/or the like. In particular, the building 32A includes a building controller 36A and building equipment 38A, the building 32B includes a building controller 36B and building equipment 38B, and so on through the building 32N, which includes a building controller 36N and building equipment 38N. It will be appreciated that while each building is illustrated as having a single building controller and single building equipment controlled by the single building controller, in some cases a building may have multiple related or unrelated building controllers and/or multiple pieces of related or unrelated building equipment.

The plurality of mobile devices 34 may be considered as being divided into a set of mobile devices each associated with a corresponding building. In the example shown, the plurality of mobile devices 34 may be considered as being divided into a set of mobile devices 40A that are associated with the building 32A, a set of mobile devices 40B that are associated with the building 32B, and so on through a set of mobile devices 40N that are associated with the building 32N. As illustrated, the set of mobile devices 40A includes a first mobile device 42A, a second mobile device 44A and a third mobile device 46A. The set of mobile devices 40B includes a first mobile device 42B, a second mobile device 44B and a third mobile device 46B and so on through the set of mobile devices 40N, which includes a first mobile device 42N, a second mobile device 44N and a third mobile device 46N. This is merely illustrative, as any number of mobile devices such as smartphones or tablets, may be associated with a particular building, as desired. Each user or occupant of a building may have an associated mobile device, or may have several associated mobile devices. In some cases, a user or occupant may have a mobile device associated with several different locations such as a home, a cabin or a place of work.

Associating a mobile device with a particular building generally involves the individual who uses the particular mobile device. In the example shown in FIG. 3, a mobile device can communicate with the building automation server 26, and may cause the building automation server 26 to provide instructions to the building controller that is associated with the particular mobile device. For example, and in some instances, a mobile phone with location services activated can be used to inform the building automation server 26 as to the whereabouts of the user relative to a geo-fence defined for the associated building, and in some cases an estimate of how long before the user will arrive at the associated building. The building automation server 26 may send a command to the building controller of the associated building to operate the building equipment in an energy savings manner when all of the users that are associated with a particular building are determined to be away from the building (e.g. the building is unoccupied). The building automation server 26 may send a command to the building controller of the associated building to operate the building equipment in a comfort mode when all of the users that are associated with a particular building are determined or deemed not to be away from the building (e.g. the building is occupied).

In some instances, the building automation server 26 may be configured to maintain a current geo-fence state for each of the one or more mobile devices 14 based on the geo-fence state received from each of the one or more mobile devices. In some cases, the geo-fence state for each of the one or more mobile devices 14, the association between each of the mobile devices and corresponding buildings and as well as other information may be stored in a database that is part of or accessible by the building automation server 26. Example non-limiting databases include MySQL, PostgreSQL, Microsoft SQL Server, Oracle, Sybase and IBM DB2.

Figure 4:
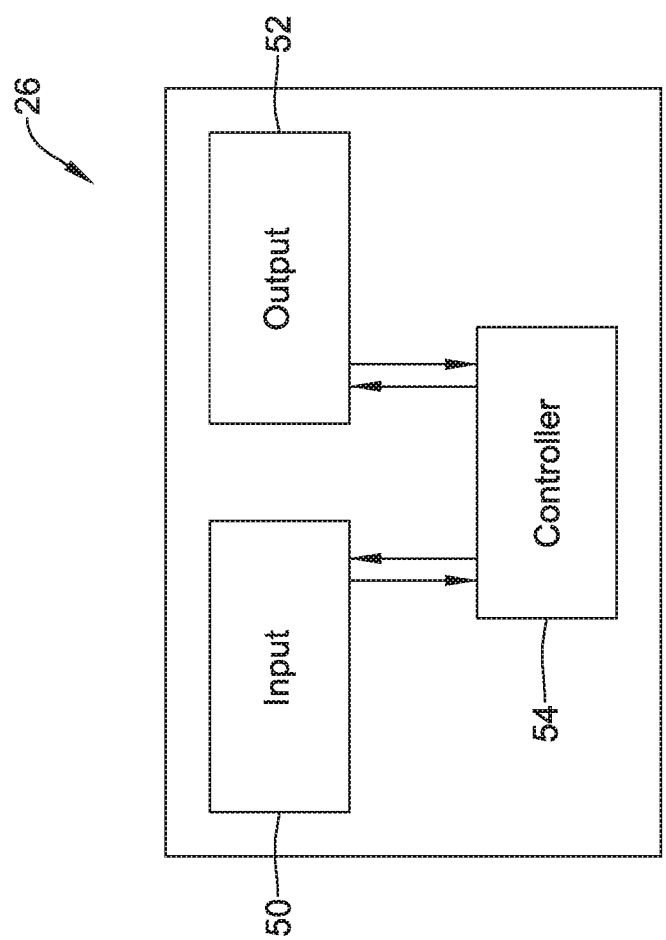
FIG. 4 is a schematic view of an illustrative building automation server.

FIG. 4 is a schematic illustration of the building automation server 26, as previously referenced in FIGS. 2 and 3. The building automation server 26 may be configured for servicing a user's building, and in some cases other buildings. The building automation server 26 may include an input 50, an output 52 and a controller 54 that is operably coupled to the input 50 and the output 52. The input 50 and the output 52 may take any appropriate physical or electrical form. In some instances, the input 50 may be configured for receiving information regarding a geo-fence state of one or more mobile devices (such as the mobile device 14 shown in FIGS. 1 and 2). In some cases, the geo-fence state may be selected from at least an inside geo-fence state in which a corresponding mobile device 14 is deemed to be inside a geo-fence that is defined for the user's building, and an outside geo-fence state in which the corresponding mobile device 14 is deemed to be outside of the geo-fence that is defined for the user's building. The output 52 may be configured for outputting a command to a building controller in the user's building. For example, the output 52 may be configured to output an away command to the building controller 32a in Building One (FIG. 3) when the building automation server 26 determines that all of the mobile devices 40a associated with Building One 32a are in the outside geo-fence state. Likewise, the output 52 may be configured to output a home command to the building controller 32a in Building One (FIG. 3) when the building automation server 26 determines that all of the mobile devices 40a associated with Building One 32a are not in the outside geo-fence state.

When the building controller is an HVAC controller, the controller 54 may be configured to output a command via the output 52 to change a set point of the building controller to an energy saving set point when the controller 54 detects that the current geo-fence state of all of the one or more mobile devices 14 associated with the building are in the outside geo-fence state. In some cases, the controller 54 may be configured to output a command via the output 52 to change the set point of the building controller to a comfort set point upon detecting that the current geo-fence state of all of the one or more mobile devices 14 associated with the building are not in the outside geo-fence state, i.e., one or more of the mobile devices 14 are in the inside geo-fence state.

In some instances, the controller 54 is configured to not send a new command, such as to change the set point of the building controller, if the received geo-fence state of the one or more mobile devices 14 would not result in a different command being output. For example, if the current geo-fence state of all of the one or more mobile devices 14 were in the outside geo-fence state, with the controller 54 aware of the status of each of the one or more mobile devices 14, and the controller 54 receives an outside geo-fence state from one of the one or mobile devices 14, the controller 54 may be configured to not send a command to the building controller as there is nothing to change. In some cases, the controller 54 will only send a command to the building controller when there is something to change.

In some instances, the controller 54 may be configured to solicit location information from one or more of the mobile devices. For example, the controller 54 may be configured to solicit location information from a particular mobile device 14 if, for example, the controller 54 has not received a geo-fence state for the particular mobile device 14 for a predetermined length of time. In some cases, the controller 54 may solicit location information from a particular mobile device 14 if the controller 54 has not received any location information from that mobile device 14 for a period of time such as one hour, two hours, three hours, four hours, six hours, twelve hours, twenty-four hours, or more or less.

In some cases, the controller 54 may be configured to solicit location information from a particular mobile device 14, or perhaps from each of the one or more mobile devices 14 on a regular, repeating schedule of any desired frequency. In some embodiments, however, the controller 54 may be configured to solicit location information from a particular mobile device 14 at an increased frequency if a geo-fence crossing by the particular mobile device 14 is anticipated. For example, if the controller 54 learns from history that a particular user tends to cross a geo-fence on their way home every weekday between 5 pm and 6 pm, the controller 54 may solicit location information on a more frequent basis each weekday between 5 pm and 6 pm, or perhaps between 4:30 pm and 6:30 pm, or perhaps from 4:30 pm to until a crossing is detected.

In some cases, the controller 54 may be configured to solicit location information of a higher accuracy level from a particular mobile device 14 if a geo-fence crossing by the particular mobile device 14 is anticipated. For example, a low accuracy level request from the controller 54 may cause the mobile device 14 to rely on cell signal strength, triangulation, and/or other option lower power than GPS. Conversely, a high accuracy level request may cause the mobile device 14 to rely on a more accurate but more power-hungry location service such as GPS. In some cases, the controller 54 may be configured to send one of the mobile devices 14 a request to temporarily turn on GPS functionality within the mobile device and to return a GPS location to the controller 54. In some instances, the mobile device may instead return the geo-fence state (in or out) to the controller 54. In some cases, each of the one or more mobile devices 14 do not send an updated geo-fence state to the input 50 unless the geo-fence state of the corresponding mobile device 14 changes. In some instances, each of the one or more mobile devices 14 may send an updated geo-fence state to the input 50 when the geo-fence state of the corresponding mobile device 14 changes.

Figure 5:
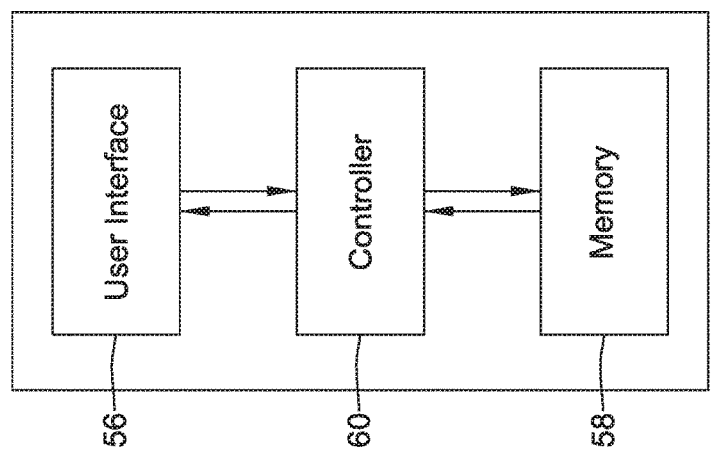
FIG. 5 is a schematic view of an illustrative mobile device.

FIG. 5 is a schematic diagram of the illustrative mobile device 14, as previously referenced in FIGS. 1 and 2. The illustrative mobile device 14 has location services for determining a location of the mobile device 14, and includes a user interface 56, a memory 58 and a controller 60 that is operably coupled to the user interface 56 and to the memory 58. In some cases, the memory 58 may be configured to store information pertaining to a geo-fence assigned to a building, as well as storing an executable program. In some cases, the controller 60 may be configured to check the location of the mobile device via the location services of the mobile device 14 and compare the current detected location relative to the geo-fence with a previously detected location relative to the geo-fence stored in the memory 58. The controller 60 may be configured to provide the remote server 26 with the current detected location relative to the geo-fence if the current detected location relative to the geo-fence is different from the previously detected location relative to the geo-fence. Alternatively, in some cases, the controller 60 may instead return the geo-fence status. In some cases, the controller 60 may not provide the remote server 26 with the current detected location relative to the geo-fence or geo-fence status if the current detected location relative to the geo-fence is the same as the previously detected location relative to the geo-fence or the previous geo-fence status.

In some instances, the controller 60 is configured to check the location of the mobile device relative to the geo-fence from time to time. For example, the controller 60 may check the location of the mobile device each hour or each half hour. In some cases, the controller 60 may check the location of the mobile device relative to the geo-fence in response to an internal stimuli or an external stimuli. A variety of different internal and external stimuli are contemplated. Illustrative but non-limiting examples of internal stimuli include the mobile device 14 detecting a restoration of cellular service and/or a restoration of internet service to the mobile device 14. In some cases, if there is a loss in cellular service or internet service, the mobile device 14 is unable to transmit its geo-fence status. When service is restored, the mobile device 14 can go ahead and transmit its geo-fence status. In some cases, the mobile device 14 may first update its geo-fence status before transmitting its geo-fence status.

Another example internal stimuli may include restoration of the location services of the mobile device 14. If location services has been turned off, either accidently or intentionally, the mobile device 14 will be unable to determine its location. When this is discovered, or the user otherwise turns location services back on, the mobile device 14 may check its location and report its geo-fence status to the remote server 26.

In some cases, if a user is talking on the mobile device 14 during a geo-fence crossing, the mobile device 14 may not be able to report the crossing until after the phone call. In such a case, the mobile device 14 may repeatedly attempt to report the crossing until the crossing is successfully reported or a time limit is reached. In some cases, the time limit is a span of time that begins with termination of the phone call. If attempts to report the crossing repeatedly fail, the user may be informed of this via the user interface 56. For example, if the mobile device 14 is an Android device, and an initial communication attempt with the building automation server 26 fails, the mobile device 14 may try again in thirty seconds, then in one minute, then in two minutes, then in four minutes, then in eight minutes, and then again in thirty minutes. It will be appreciated that these time spans are merely illustrative.

In some instances, the mobile device 14 includes an executable program stored in the memory 58 that governs and controls some of the communication with the building automation server 26. Another example of an internal stimuli is detecting a user logging in to the executable program. This may be a physical login, in which the user enters user name and password, or it may be an auto-login utilizing stored user name and password information. Another example is detecting a wake up condition from a force close of the executable program. The user switching off airplane mode, and powering on the mobile device 14, are other examples of internal stimuli. If the mobile device 14 detects an updated geo-fence, or detects a new location and associated geo-fence, the mobile device 14 may also treat these as internal stimuli.

In some cases, if the executable program detects that the mobile device 14 is in a state in which the mobile device 14 is not able to detect a geo-fence crossing, the executable program may notify the user via the user interface 56 that there is a problem. In some cases, the executable program may also inform the user how to correct the problem. It may, for example, be as simple as turning on location services, or turning geo-fencing on, or exiting airplane mode. In some embodiments, it is contemplated that if possible, the executable program may itself modify settings within the mobile device 14 to correct the problem, perhaps with a notification to the user that an automatic setting change was made.

There are a number of illustrative but non-limiting examples of external stimuli that may cause the controller 60 to check the location of the mobile device relative to the geo-fence. For example, the controller 60 may check the location of the mobile device in response to being informed that a suspend mode of the geo-fence has been turned off at a remote location, such as at a particular building controller, or that another user has turned their geo-fencing on or off. In some embodiments, there may be a desire to instruct the building controller to operate manually (e.g. without geo-fencing), at least for a period of time. While operating manually, the building controller may operate one or more building systems to maintain a particular temperature set point or schedule, a lighting mode, a security system mode, and the like. While operating manually, the building controller may ignore any geo-fence events and/or geo-fence related commands from a building automation server 26. In some instances, the building automation server 26 may keep track of geo-fence events that occur during a period of manual operation resulting from an individual triggering a suspend mode using either the building controller or their mobile device. While geo-fence events may not be transmitted to the building controller, or may be transmitted to the building controller but ignored by the building controller, the building automation server 26 may still use those triggers to update the status of each assigned user.

Other examples of external stimuli may include geo-fencing changes and/or geo-fence events of other users. For example, the mobile device 14 may be informed that the geo-fence has been modified at a remote location, or that another user associated with the building has crossed the geo-fence, or that the geo-fence status of another user has changed. Each of these may be considered external stimuli. Another external stimuli may be the mobile device receiving a request for current location from a remote location, such as the building automation server 26.

FIG. 6 is a flow diagram of an illustrative method that may be carried out by the mobile device 14, having location services and executing an executable program that may be stored in the memory 58 (FIG. 5). In some cases, the mobile device 14 is a smartphone, but this is not required. At block 70, the mobile device 14 stores information pertaining to a geo-fence that is associated with a user of the mobile device 14 and that is assigned to a location (e.g. assigned to the user's building). As seen at block 72, a current location of the mobile device 14 is identified via the location services of the mobile device 14. The locating data is stored at block 74, including the current location of the mobile device 14 and one or more past locations of the mobile device 14.

As generally indicated at block 76, a current geo-fence state of the mobile device 14 is determined based on the location data in response to an internal stimuli or an external stimuli, wherein the geo-fence state is selected from at least an inside geo-fence state in which the mobile device 14 is deemed to be inside the geo-fence and an outside geo-fence state in which the mobile device 14 is deemed to be outside of the geo-fence. The internal stimuli and external stimuli may be the same as those discussed with respect to FIG. 5. A remote server, such as the building automation server 26, may be notified of the current geo-fence state, as seen at block 78.

FIG. 7 is a flow diagram showing another illustrative method that may be carried out by the mobile device 14, having location services and executing an executable program that may be stored in the memory 58 (FIG. 5). At block 70, the mobile device 14 stores information pertaining to a geo-fence that is associated with a user of the mobile device 14 and that is assigned to a location (e.g. assigned to the user's building). As seen at block 72, a current location of the mobile device 14 is identified via the location services of the mobile device 14. The locating data is stored at block 74, including the current location of the mobile device 14 and one or more past locations of the mobile device 14.

As generally indicated at block 76, a current geo-fence state of the mobile device 14 is determined based on the location data in response to an internal stimuli or an external stimuli, wherein the geo-fence state is selected from at least an inside geo-fence state in which the mobile device 14 is deemed to be inside the geo-fence and an outside geo-fence state in which the mobile device 14 is deemed to be outside of the geo-fence. A remote server, such as the building automation server 26, is notified of the current geo-fence state, as seen at block 78. In some cases, as generally indicated at block 80, a determination may be made as to whether the mobile device 14 has crossed the geo-fence by referencing the geo-fence status over time. In some embodiments, as seen at block 82, the remote server may be notified that the mobile device 14 has crossed the geo-fence if such a determination was made at block 80.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A non-transitory computer-readable storage medium with an executable program stored thereon, wherein the executable program instructs a mobile device having location services and a communication interface for communicating with a remote server to perform the following:
    save information pertaining to a geo-fence, wherein the geo-fence is associated with a user of the mobile device and defines a boundary of a fixed location of a building;
    save a previous geo-fence state of the mobile device both locally on the mobile device and remotely on the remote server, wherein the previous geo-fence state is based on a previous location of the mobile device, and wherein the previous geo-fence state is selected from at least an inside geo-fence state in which the previous location of the mobile device is determined to be inside of the boundary of the fixed location of the building and an outside geo-fence state in which the previous location of the mobile device is determined to be outside of the boundary of the fixed location of the building;
    identify a current location of the mobile device via the location services;
    determine a current geo-fence state of the mobile device based on the current location of the mobile device, wherein the current geo-fence state is selected from at least the inside geo-fence state in which the current location of the mobile device is determined to be inside of the boundary of the fixed location of the building and the outside geo-fence state in which the mobile device is determined to be outside of the boundary of the fixed location of the building;
    compare the current geo-fence state with the previous geo-fence state;
    when the current geo-fence state fails to match the previous geo-fence state, communicate the current geo-fence state to the remote server to update the previous geo-fence state to reflect the current geo-fence state; and
    when the current geo-fence state matches the previous geo-fence state, refrain from communicating the current geo-fence state to the remote server.

2. The non-transitory computer-readable storage medium of claim 1, wherein the executable program instructs the mobile device to periodically determine the current geo-fence state and compare the current geo-fence state with the previous geo-fence state.

3. The non-transitory computer-readable storage medium of claim 1, wherein the executable program instructs the mobile device to determine the current geo-fence state and compare the current geo-fence state with the previous geo-fence state in response to an internal stimuli.

4. The non-transitory computer-readable storage medium of claim 3, wherein the internal stimuli includes one or more of:
    detecting a restoration of communication via the communication interface;
    detecting a restoration of the location services;
    detecting first user input logging into the executable program;
    detecting a wake up condition from a force close of the executable program;
    detecting the mobile device exiting an airplane mode;
    detecting second user input turning on the location services;
    detecting third user input turning on geo-fencing on the mobile device; and
    detecting a power on condition of the mobile device.

5. The non-transitory computer-readable storage medium of claim 1, wherein the executable program instructs the mobile device to determine the current geo-fence state and compare the current geo-fence state with the previous geo-fence state in response to an external stimuli.

6. The non-transitory computer-readable storage medium of claim 5, wherein the external stimuli includes one or more of:
    the mobile device being informed via the communication interface that a suspend mode of the geo-fence has been turned off;
    the mobile device being informed via the communication interface that the geo-fence has been modified at a remote location;
    the mobile device being informed via the communication interface that another user has crossed the geo-fence;
    the mobile device being informed via the communication interface that any geo-fence state of the another user has changed;
    the mobile device being informed via the communication interface that geo-fencing has been turned on; and
    the mobile device receiving a request via the communication interface for the current location of the mobile device from a remote location.

7. A system comprising
    a mobile device; and
    a remote server,
    wherein the mobile device saves information pertaining to a geo-fence received from the remote server,
    wherein the geo-fence is associated with a user of the mobile device and defines boundary of a fixed location of a building,
    wherein the mobile device saves a previous geo-fence state of the mobile device both locally on the mobile device and remotely on the remote server,
    wherein the previous geo-fence state is based on a previous location of the mobile device,
    wherein the previous geo-fence state is selected from at least an inside geo-fence state in which the previous location of the mobile device is determined to be inside of the boundary of the fixed location of the building and an outside geo-fence state in which the previous location of the mobile device is determined to be outside of the boundary of the fixed location of the building,
    wherein the mobile device identifies a current location of the mobile device via location services of the mobile device, determines a current geo-fence state of the mobile device based on the current location of the mobile device, and compares the current geo-fence state with the previous geo-fence state,
    wherein the current geo-fence state is selected from at least the inside geo-fence state in which the current location of the mobile device is determined to be inside of the boundary of the fixed location of the building and the outside geo-fence state in which the current location of the mobile device is determined to be outside of the boundary of the fixed location of the building,
    wherein, when the current geo-fence state fails to match the previous geo-fence state, the mobile device transmits the current geo-fence state to the remote server to update the previous geo-fence state to reflect the current geo-fence state, and wherein, when the current geo-fence state matches the previous geo-fence state, the mobile device refrains from transmitting the current geo-fence state to the remote server.

8. The system of claim 7, wherein if the mobile device periodically determines the current geo-fence state and compares the current geo-fence state with the previous geo-fence state.

9. The system of claim 7, wherein the mobile device determines the current geo-fence state and compares the current geo-fence state with the previous geo-fence state in response to an internal stimuli.

10. The system of claim 9, wherein the internal stimuli includes one or more of:
 detecting a restoration of communication via a communication interface of the mobile device;
 detecting a restoration of the location services;
 detecting first user input logging into an executable program on the mobile device;
 detecting a wake up condition from a force close of the executable program;
 detecting the mobile device exiting an airplane mode;
 detecting second user input turning on the location services;
 detecting third user input turning on geo-fencing on the mobile device; and
 detecting a power on condition of the mobile device.

11. The system of claim 7, wherein the mobile device determines the current geo-fence state or not and compares the current geo-fence state with the previous geo-fence state in response to an external stimuli.

12. The system of claim 11, wherein the external stimuli includes one or more of:
 the mobile device being informed via a communication interface of the mobile device that a suspend mode of the geo-fence has been turned off;
 the mobile device being informed via the communication interface that geo-fence has been modified at a remote location;
 the mobile device being informed via the communication interface that another user has crossed the geo-fence;
 the mobile device being informed via the communication interface that any geo-fence state of the another user has changed;
 the mobile device being informed via the communication interface that geo-fencing has been turned on; and
 the mobile device receiving a request via the communication interface for the current location of the mobile device from a remote location.

13. A mobile device comprising:
 a user interface;
 location services for determining a current location of the mobile device;
 a communication interface for communicating with a remote server;
 a memory for storing an executable program and information pertaining to a geo-fence that defines a boundary of a fixed location of a building; and
 a controller operatively coupled to the user interface, the location services, the communication interface, and the memory,
 wherein the controller is configured to:
  save a previous geo-fence state of the mobile device both locally on the mobile device and remotely on the remote server, wherein the previous geo-fence state is based on a previous location of the mobile device, and wherein the previous geo-fence state is selected from at least an inside geo-fence state in which the previous location of the mobile device is determined to be inside of the boundary of the fixed location of the building and an outside geo-fence state in which the previous location of the mobile device is determined to be outside of the boundary of the fixed location;
  identify the current location of the mobile device via the location services;
  determine a current geo-fence state of the mobile device based on the current location of the mobile device, wherein the current geo-fence state is selected from at least the inside geo-fence state in which the current location of the mobile device is determined to be inside of the boundary of the fixed location of the building and the outside geo-fence state in which the mobile device is determined to be outside of the boundary of the fixed location of the building;
  compare the current geo-fence state with the previous geo-fence state;
  when the current geo-fence state fails to match the previous geo-fence state, communicate the current geo-fence state to the remote server to update the previous geo-fence state to reflect the current geo-fence state; and
  when the current geo-fence state matches the previous geo-fence state, refrain from communicating the current geo-fence state to the remote server.

14. The mobile device of claim 13, wherein the controller periodically determines the current geo-fence state and compares the current geo-fence state with the previous geo-fence state.

15. The mobile device of claim 13, wherein the controller determines the current geo-fence state and compares the current geo-fence state with the previous geo-fence state in response to an internal stimuli.

16. The mobile device of claim 15, wherein the internal stimuli includes one or more of:
 detecting a restoration of communication via the communication interface;
 detecting a restoration of the location services;
 detecting first user input logging into the executable program;
 detecting a wake up condition from a force close of the executable program;
 detecting the mobile device exiting an airplane mode;
 detecting second user input turning on the location services;
 detecting third user input turning on geo-fencing on the mobile device; and
 detecting a power on condition of the mobile device.

17. The mobile device of claim 13,
 wherein the controller determines the current geo-fence state and compares the current geo-fence state with the previous geo-fence state in response to an external stimuli.

18. The mobile device of claim 17, wherein the external stimuli includes one or more of:
 the mobile device being informed via the communication interface that a suspend mode of the geo-fence has been turned off;

the mobile device being informed via the communication interface that the geo-fence has been modified at a remote location;
the mobile device being informed via the communication interface that another user has crossed the geo-fence;
the mobile device being informed via the communication interface that any geo-fence state of the another user has changed;
the mobile device being informed via the communication interface that geo-fencing has been turned on; and
the mobile device receiving a request via the communication interface for the current location of the mobile device from a remote location.

\* \* \* \* \*